July 20, 1937.  R. WILES  2,087,714
OIL GAUGE STICK
Filed Nov. 11, 1936
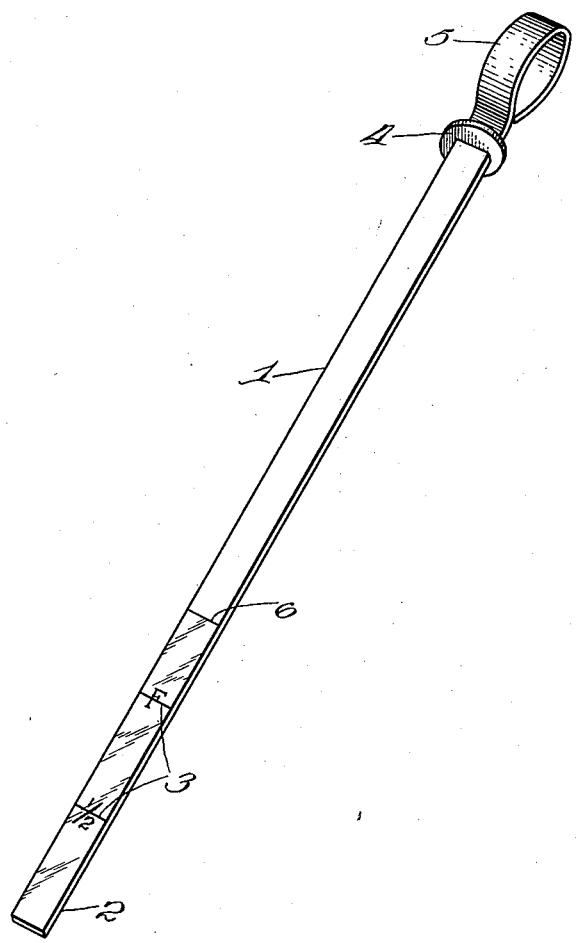
Inventor:
Russell Wiles.
By Dyrenforth, Lee, Chritton & Wiles
Attys.

Patented July 20, 1937

2,087,714

UNITED STATES PATENT OFFICE 2,087,714

OIL GAUGE STICK

Russell Wiles, Chicago, Ill., assignor to De Luxe Products Corporation, a corporation of Indiana Application November 11, 1936, Serial No. 110,369

3 Claims. (Cl. 73—120)

This invention relates to an oil gauge stick, and particularly to an oil gauge stick for use in the lubrication system of an internal combustion engine which is provided with a modern oil filter.

It has heretofore been the practice to test the oil, either by means of a blotter or visually, to determine when blackening occurs. A much more accurate test may be made, however, by placing a drop of oil upon a mirrored surface. A drop of clean oil placed upon a mirrored surface does not cloud the mirror, but the least trace of asphaltic material in the oil produces a most remarkable and noticeable effect upon the mirrored surface.

In accordance with this invention, the oil gauge stick commonly used in internal combustion engines, such as automobiles, is provided with a mirror finish upon the oil immersible end. As illustrated in the drawing, the oil gauge stick 1 comprising a handle 5, an oil immersible end 2 provided with gauge notations 3 and a stop 4, is made mirror finished at the oil immersible end, preferably throughout the oil immersible portion thereof: For example, up to the point 6.

The mirror finish may be provided by chromium plating or by burnishing a stainless steel or other metallic stick, or by any other means which will produce a permanent mirror finish.

The foregoing detailed description has been given for clearness of understanding only, and no unnecessary limitations should be understood therefrom, but the appended claims should be construed as broadly as permissible, in view of the prior art.

I claim:

1. An oil gauge stick for use in the lubrication system of an internal combustion engine, comprising a gauge stick having a mirror-finished oil immersible portion thereon.

2. A gauge as set forth in claim 1, in which the stick is of stainless steel.

3. A stick as set forth in claim 1, in which the oil immersible portion is chromium plated.

RUSSELL WILES.